United States Patent [19]

Staufenberg et al.

[11] Patent Number: 5,761,901
[45] Date of Patent: Jun. 9, 1998

[54] METHOD OF CHECKING THE EFFICIENCY OF A CATALYTIC CONVERTOR IN AN INTERNAL COMBUSTION ENGINE

[75] Inventors: Ulrich Staufenberg, Diethardt; Peter Olejnik, Bad Soden, both of Germany

[73] Assignee: VDO Adolf Schindling AG, Frankfurt, Germany

[21] Appl. No.: 761,160

[22] Filed: Dec. 6, 1996

[30] Foreign Application Priority Data

Dec. 7, 1995 [DE] Germany .................. 195 45 693.9

[51] Int. Cl.⁶ ............................................ F01N 3/20
[52] U.S. Cl. .......................... 60/274; 60/276; 60/277; 73/118.1
[58] Field of Search ................ 60/274, 276, 277; 73/118.1

[56] References Cited

U.S. PATENT DOCUMENTS 5,157,921  10/1992  Ito et al. .................. 60/277 X
5,237,818   8/1993  Ishii et al. ................ 60/277 X
5,341,642   8/1994  Kurihara et al. ........... 60/277 X
5,363,646  11/1994  Orzel et al. .............. 60/277 X
5,386,693   2/1995  Orzel ..................... 60/277 X Primary Examiner—Tony M. Argenbright
Attorney, Agent, or Firm—Martin A. Farber

[57] ABSTRACT

A method of checking the efficiency of a catalytic converter in an internal combustion engine in which a ratio is formed from the amplitude of the output signal of a lambda probe arranged behind the catalytic converter and from the amplitude of the output signal of a lambda probe arranged in front of the catalytic converter. The ratio is compared with a threshold value, the catalytic converter being recognized as deficient if the ratio is less than the threshold value. In order to compensate for the lack of sharpness resulting from the manufacturing process and the aging of the probe, the method provides for determining the efficiency of the catalyst in which an extreme value of the corresponding probe output signal is determined for each probe after each probe reversal.

9 Claims, 3 Drawing Sheets

METHOD OF CHECKING THE EFFICIENCY OF A CATALYTIC CONVERTER IN AN INTERNAL COMBUSTION ENGINE

FIELD AND BACKGROUND OF THE INVENTION

The present invention relates to a method of checking the efficiency of a catalytic converter in an internal combustion engine in which a ratio is formed between the amplitude of the output signal of a lambda probe arranged behind the catalytic converter and the amplitude of the output of a lambda probe arranged in front of the catalytic converter, and wherein a value of the ratio is compared with a threshold value, the catalytic converter being recognized to be defective if the ratio is less than the threshold value.

In order to obtain exhaust gases which are as free as possible of noxious substances, control devices for internal combustion engines are known in which the oxygen content in the exhaust pipe is measured and evaluated. For this purpose, oxygen measurement probes are known, so called lambda probes, which operate, for instance, in accordance with the principle of ionic conduction through a solid electrolyte as a result of a difference in oxygen partial pressure and give off a voltage signal corresponding to the oxygen partial pressure present in the exhaust gas. The signal experiences a voltage jump upon transfer from a deficiency of oxygen to an excess of oxygen, or vice versa.

The output signal of the lambda probe is evaluated by a controller which, in its turn, adjusts the fuel-air mixture by an actuator.

By adjustment of the fuel-air ratio there is primarily desired a reduction of the injurious portions of the exhaust emitted by internal combustion engines.

For the diagnosis of the degree of conversion of the catalytic converter, a second lambda probe is arranged behind the catalytic converter.

The efficiency of a catalytic converter is customarily determined in the manner that the ratio is formed from the amplitude of the signal of the rear lambda probe and the amplitude of the signal of the front lambda probe. If this ratio exceeds a predetermined limit value, the catalytic converter is defective.

The amplitude ratio determined, in this manner, is based on the maximum possible stroke of the corresponding lambda probe. This stroke, however, also changes from probe to probe depending on dispersions in the manufacturing process as well as the aging of the probe.

Furthermore, that lambda probe which is arranged in front of the catalytic converter is subject to faster aging in operation.

From this there results a lack of clarity for the corresponding determination of the efficiency of the catalytic converter.

SUMMARY OF THE INVENTION

It is an object of the invention to provide a method for determining the efficiency of the catalytic converter which compensates for the lack of clarity resulting from the manufacturing process and the aging of the probe.

According to the invention, for each probe, an extreme value of the corresponding probe-output signal after each shift of the probe is determined.

The advantage of the invention is that the determination of the amplitude ratio is effected over, in each case, a full swing of the probe signals. In this connection, the changes in signal stroke over the life of the lambda probes are taken into consideration.

The extreme values advantageously result from a continuous formation of the difference between successive discrete scannings of the output signal of each lambda probe, in which connection, upon each change in sign of the difference from positive to negative, a maximum is recognized and, upon each change in sign of the difference from negative to positive a minimum is recognized.

In one embodiment, the output signal of each lambda probe is scanned discretely, and from the discrete scannings an average value is formed for the smoothing-out of the corresponding signal, which average value, in its turn, is taken as basis for the formation of the extreme value. The smoothing advantageously takes place via a sliding averaging from several successive scannings of the output signals of each lambda probe after a reversal of the probe. In order to increase the accuracy of the determination of the efficiency, the ratio of the amplitude of the output signal of the lambda probe arranged behind the catalytic converter to the output signal of the lambda probe arranged in front of the catalytic converter is formed for several diagnostic windows, in which connection the amplitude ratios determined in the individual diagnostic windows are averaged and compared with a threshold value.

According to a feature of the invention, after a rich/lean reversal of the first lambda probe, the maximum of the corresponding discretely scanned output signal and, after a lean/rich reversal, the minimum of the corresponding discretely scanned output signal is determined, the amount of the difference between maximum and minimum representing the amplitude of the corresponding output signal of each probe.

According to a further feature of the invention, the ratio of the amplitude of the output signal of the lambda probe arranged behind the catalytic converter to the output signal of the lambda probe arranged in front of the catalytic converter is formed for several diagnostic windows, in which connection the amplitude ratios determined in the individual diagnostic windows are averaged and compared with a threshold value.

Preferably, the output signals of the lambda probes are measured during several successive, non-overlapping speed ranges of the internal combustion engine.

In another embodiment, the output signals are measured during several successive, non-overlapping load ranges.

According to a feature of the invention, the corresponding amplitudes of the two lambda probes are modified by a probe-correction factor before they are combined to form the amplitude ratio.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
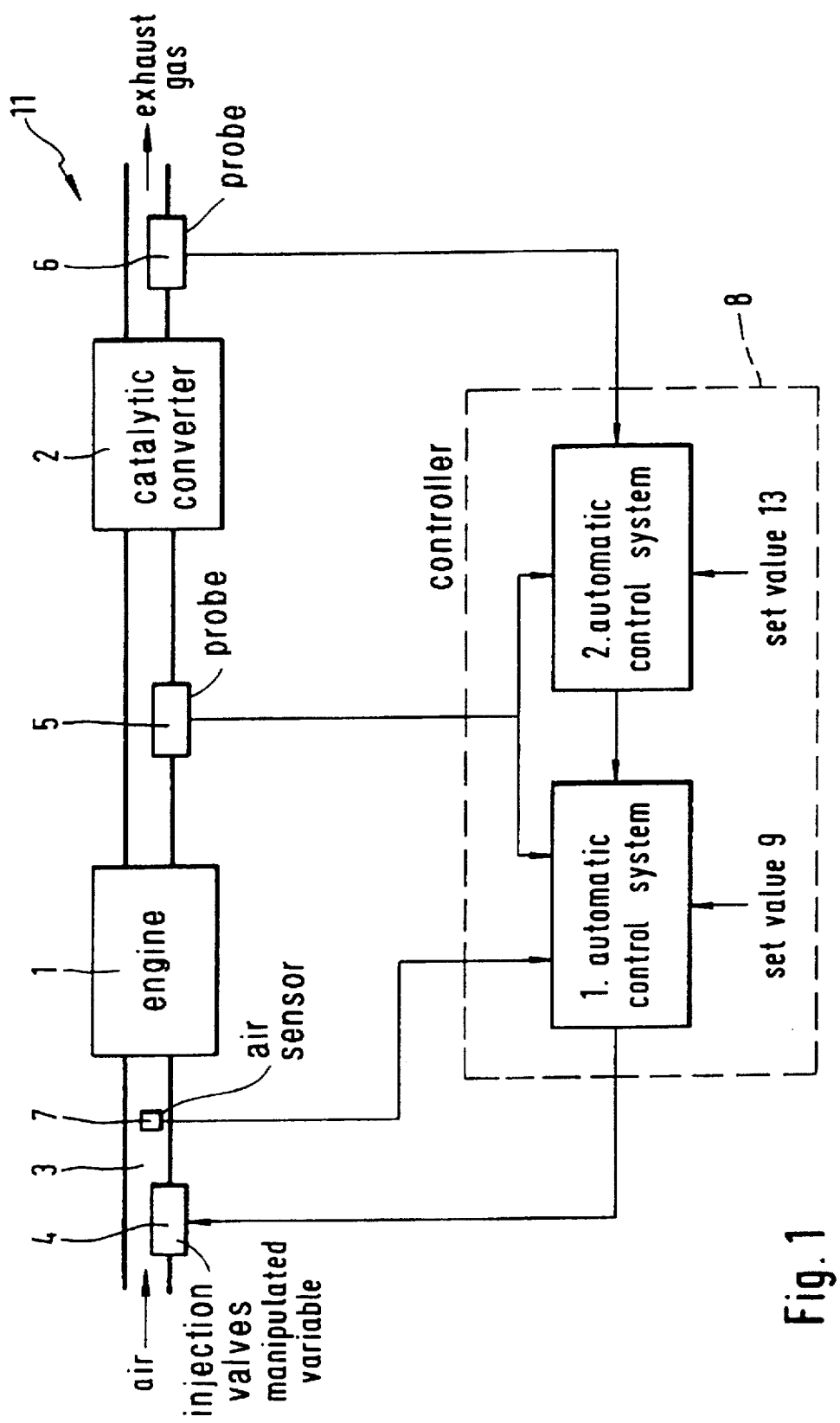
FIG. 1 is a diagrammatic showing of a device for regulating the fuel-air mixture for an internal combustion engine.

In accordance with FIG. 1, the apparatus consists of an internal combustion engine 1 having a catalytic converter 2. Via an intake pipe 3 air is fed to the engine 1. The fuel is sprayed via injection valves 4 into the intake pipe 3. Between the engine 1 and catalytic converter 2 there is a first lambda probe 5 for detecting the engine exhaust gas. In the exhaust pipe behind the catalytic converter 2 there is another lambda probe 6. The lambda probes 5 and 6 measure the corresponding lambda value of the exhaust in front of and behind the catalytic converter 2. Both signals supplied by the lambda probes 5 and 6 are conducted to a controller 8 with PI-characteristic (proportional-integration) which is ordinarily arranged in a control device (not further shown) in the motor vehicle.

From these signals and desired or set values 9, 13 which are also fed, the controller 8 forms an actuating signal which is fed to the injection valves 4. This actuating signal leads (manipulated variable) to a change in the feed of the fuel which, together with the mass of air drawn in, sensed by an air mass meter 7, results in a given lambda value of the exhaust gas.

For the determination of the functionality of the catalytic converter, a catalytic converter diagnosis is carried out at the operating temperature of the catalytic converter in different load and speed ranges which do not overlap.

Assuming that the catalytic converter temperature lies between a minimum and a maximum catalytic converter temperature threshold and the engine temperature exceeds a predetermined engine-temperature threshold, the diagnostic program is started.

First of all, with shift of the fuel-air mixture from "lean" to "rich" at the first lambda probe 5, operating as control probe, an analysis interval is started. The analysis interval terminates when the control probe 5 shifts into the other direction. From a non-averaged probe signal of the first lambda probe 5 recognition is effected of the probe changes over voltage threshold values for the first lambda probe 5.

The probe signals LS5A and LS6A of the first and the second lambda probes 5 and 6 are scanned within the analysis interval within a fixed time raster of 20 ms.

For each lambda probe, the probe signals are slidingly averaged over four scanned values.

Upon discrete scanning of the probe signal, a change in sign of two successive scanning signals indicates an extreme. The formation of the extreme value is effected on basis of the calculation of the difference between successive signals.

Figure 2:
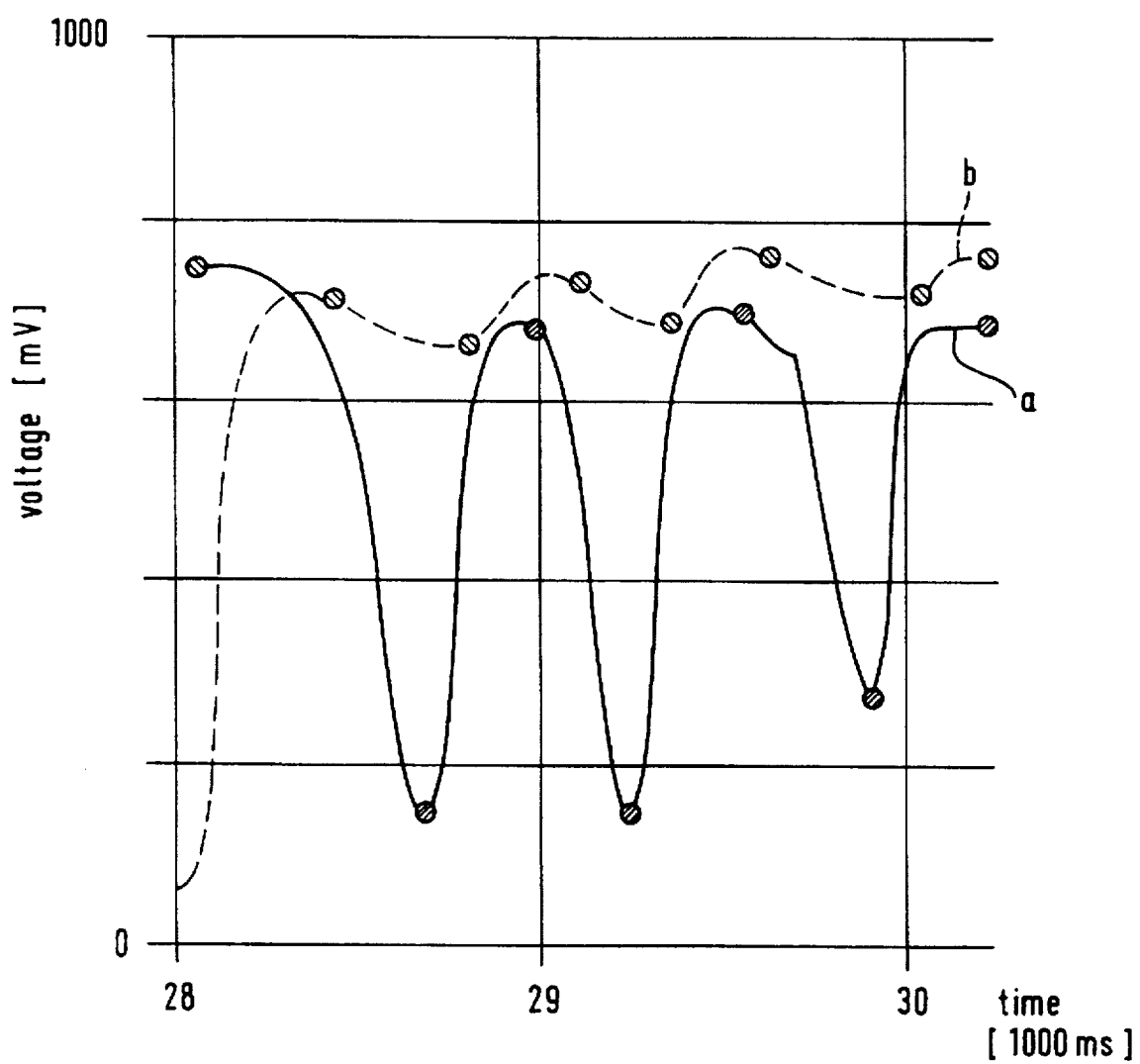
FIG. 2 is an averaged lambda signal curve with extremes.

In FIG. 2, curve a shows the change in the signal of the probe 5 in front of the catalytic converter and curve b shows the change in the signal of the probe 6 behind the catalytic converter. The extreme values are marked accordingly.

After a maximum is determined for the signal of the first lambda probe 5, the corresponding maximum for the signal of the second lambda probe 6 is determined. If no corresponding signal of the second lambda probe 6 has been recognized up to an occurrence of the second maximum of the signal of the first lambda probe 5, the amplitude of the second probe 6 is set at zero for this analysis interval and the amplitude ratio thus is formed.

The determination of the minimum is effected similar to the determination of the maximum after a reversal of the probes from "rich" to "lean" at the lambda control probe.

Between the maximum and the minimum of the signal of the first lambda probe 5, the maximum of the second lambda probe 6 must be found. After the minimum of the signal of the second probe 6, an observation interval is concluded.

From the minimum and the maximum of the measured values of the lambda probe 5 and the corresponding values of the lambda probe 6 for the corresponding analysis interval, the amplitude values are formed. The amplitude ratio then results from the division of the amplitude values of the lambda probe 6 by those of the lambda probe 5. The ratio is given by the mathematical expression:

$$AV = \frac{LS6A}{LS5A} = \frac{(LS6_{MAX} - LS6_{MIN})}{(LS5_{MAX} - LS5_{MIN})}$$

The amplitude ratio is stored. Depending on how many analysis intervals are examined, one amplitude ratio is formed for each analysis interval by the method described above.

From the amplitude ratios determined for a diagnostic window, an amplitude ratio averaging is then effected.

This amplitude ratio average value is compared with an amplitude ratio threshold value established for each diagnostic window.

A defective catalytic converter gives a large average amplitude ratio. If the average amplitude ratio is smaller than or equal to the corresponding threshold value, the catalytic converter is intact.

Figure 3:
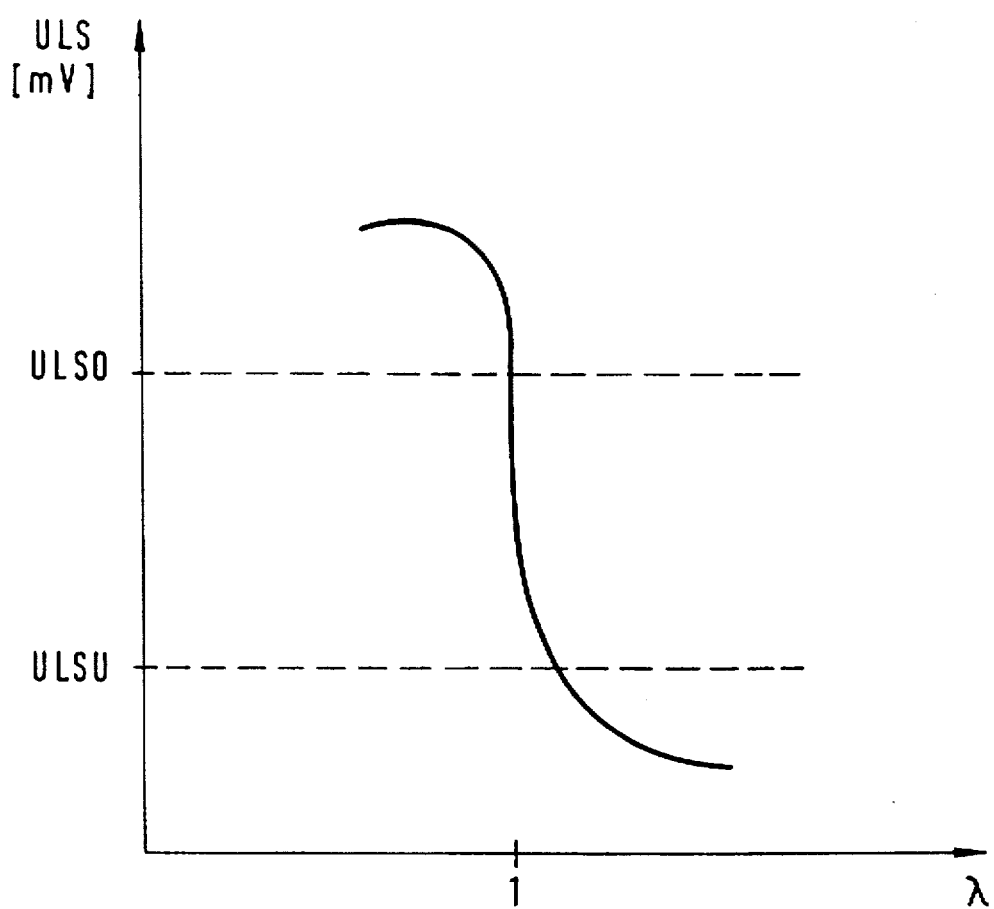
FIG. 3 shows the voltage of an lambda probe plotted over the fuel-air mixture (λ-factor)

Each lambda probe provides a course of signal over the $\lambda$-factor representing the corresponding fuel-air mixture, such as shown in FIG. 3. Depending on what type of lambda probe is used for the control, either the resistance or the voltage over the $\lambda$-factor can be considered.

The following remarks refer to the signal voltage.

If the probe is active, it has a signal voltage which lies outside the region (ULSU, ULSO). During the lean deflection, the lambda probe supplies a minimum output signal which lies below ULSU. During the rich deflection, a maximum voltage signal above ULSO in a range of 600 to 800 mV is measured. This maximum value is subject to certain dispersions due to manufacturing tolerances and aging phenomena, which are corrected by a probe correction factor.

The method will now be explained in further detail using, as example, the catalytic converter diagnosis for the monitoring of the oxygen storage capacity of the catalytic converter.

After the internal combustion engine has been started, the catalytic converter is provided with an overly rich fuel-air mixture, which results in an afterburning in the catalytic converter. The temperature produced in this way in the catalytic converter is below the operating temperature of the catalytic converter, which is normally 200° C. to 300° C. The catalytic converter thus has a greatly limited $O_2$ storage capacity. The prerequisite for the determination of the probe correction factor is that no control circuit is active.

The measurement time $T_{MAX}$ is about 2 minutes and should be concluded before the operating temperature of the catalytic converter is reached.

During the measurement time $T_{MAX}$, the probe voltage LS5 of the lambda probe 5 arranged in front of the catalytic converter 2 and the probe voltage LS6 of the lambda probe 6 arranged behind the catalytic converter 2 are measured several times at equal time intervals.

The measured values $LS5_n$ and $LS6_n$ are averaged and the average values $LS5_{av}$ and $LS6_{av}$ are stored in a memory.

The determination of the probe correction factor is effected separately for each of the two lambda probes 5 and 6, but in accordance with an analogous algorithm.

The average values $LS5_{av}$ and $LS6_{av}$ are divided in each case by an applicable constant $LS5_{MAX}$ and $LS6_{MAX}$ respectively.

This applicable constant corresponds to the maximum signal value (rich voltage value) of a reference probe and is customarily different for two probes. However, it is also conceivable to use the same constant for both lambda probes.

The quotient thus determined corresponds to the probe correction factor $LS5_{CORR}$ and $LS6_{CORR}$ wherein $$LS6_{corr} = \frac{LS5_{av}}{LS5_{MAX}} \quad ; \quad LS6_{corr} = \frac{LS6_{av}}{LS5_{MAX}}$$

The calibration values $LS5_{CORR}$ and $LS6_{CORR}$ are stored in the memory of the control device. They are continuously used during the operation of the engine and are newly formed upon a new start before the operating temperature of the engine is reached.

For the actual catalytic converter diagnosis, the amplitude ratio of the corresponding corrected amplitudes of the first and second lambda probes is formed, in which connection LSIA represents the maximum voltage of the corresponding probe:

$$AV = \frac{LS6_{ACORR}}{LS5_{ACORR}} = \frac{LS6A/LS6_{CORR}}{LS5A/LS5_{CORR}}$$

We claim:

1. A method of checking the efficiency of a catalytic converter in an internal combustion engine in which a ratio is formed between the amplitude of the output signal of a first lambda probe arranged behind the catalytic converter and the amplitude of the output of a second lambda probe arranged in front of the catalytic converter, comprising the steps of:

comparing a value of the ratio with a threshold value;

for each probe, determining an extreme value of a corresponding probe-output signal after each shift of the probe is determined; and recognizing the catalytic converter to be defective if the ratio is less than the threshold value.

2. A method according to claim 1, wherein the extreme values result from a continuous formation of the difference between successive discrete scannings of an output signal of each lambda probe;

the method further comprising steps of recognizing a maximum upon each change in sign of a difference from positive to negative; and recognizing a minimum upon each change in sign of the difference from negative to positive.

3. A method according to claim 1, further comprising steps of:

scanning discretely the output signal of each lambda probe, and from discrete scannings; and forming an average value for a smoothing-out of a corresponding signal, which average value, in its turn, is taken as basis for the formation of an extreme value.

4. A method according to claim 3, wherein for the smoothing-out, the average value is determined from sliding averaging from several successive scannings of the output signals of each lambda probe after a reversal of the respective probe.

5. A method according to claim 1, further comprising a step of:

after a rich/lean reversal of the first lambda prove, determining the maximum of the corresponding discretely scanned output signal and;

after a lean/rich reversal, determining the minimum of a corresponding discretely scanned output signal, the amount of a difference between maximum and minimum representing an amplitude of a corresponding output signal of each probe.

6. A method according to claim 1, further comprising steps of:

forming the ratio of the amplitude of the output signal of the first lambda probe to the output signal of the second lambda probe for several diagnostic windows; and averaging amplitude ratios determined in the individual diagnostic windows, and comparing amplitude ratios determined in the individual diagnostic windows with a threshold value.

7. A method according to claim 6, further comprising a step of measuring the output signals of the lambda probes during several successive, non-overlapping speed ranges of the internal combustion engine.

8. A method according to claim 6, further comprising a step of measuring the output signals during several successive, non-overlapping load ranges.

9. A method according to claim 1, further comprising a step of:

adapting corresponding amplitudes of said first and said second lambda probes by a probe-correction factor before the amplitudes are combined to form the amplitude ratio.

* * * * *